Jan. 28, 1969   D. R. ORCUTT   3,424,642
LAMINATED WINDOW PANELS
Original Filed Aug. 2, 1963   Sheet 1 of 3
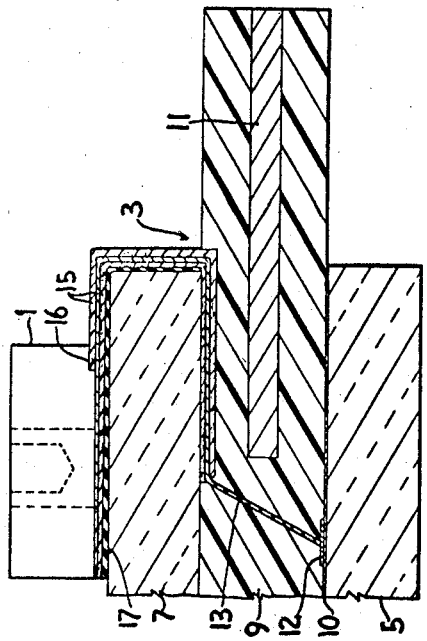
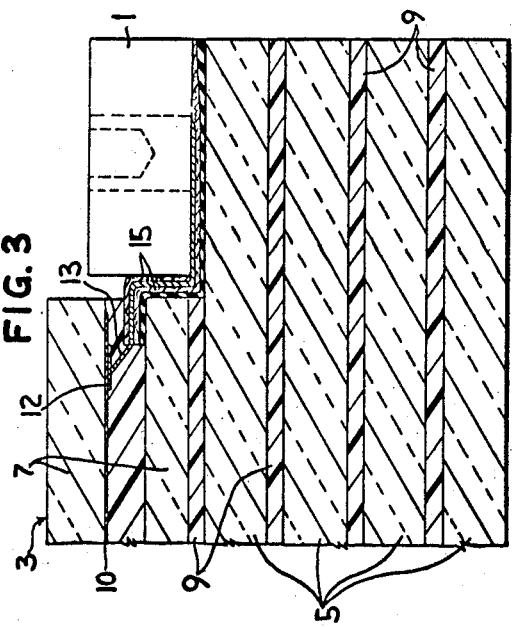
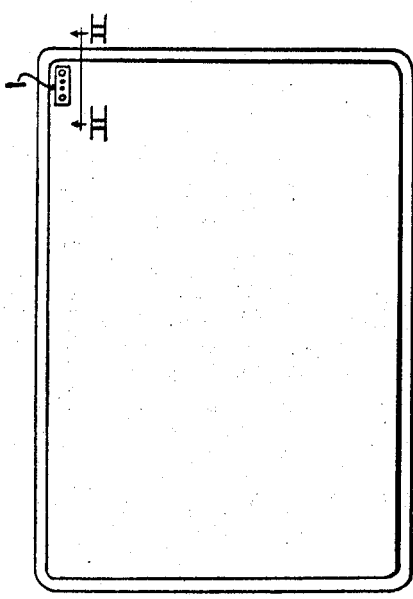
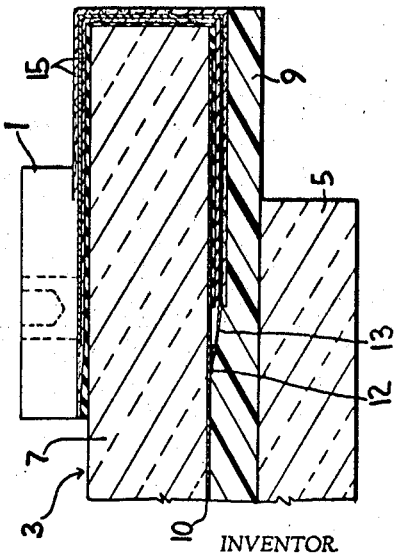
INVENTOR.
DEE R. ORCUTT
BY Chisholm & Spencer
ATTORNEYS Jan. 28, 1969 D. R. ORCUTT 3,424,642
LAMINATED WINDOW PANELS
Original Filed Aug. 2, 1963
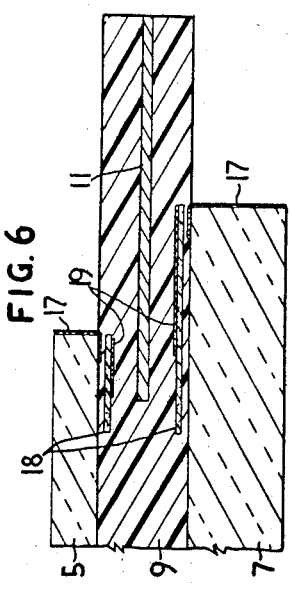
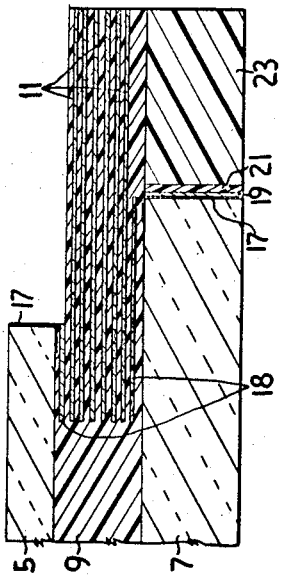
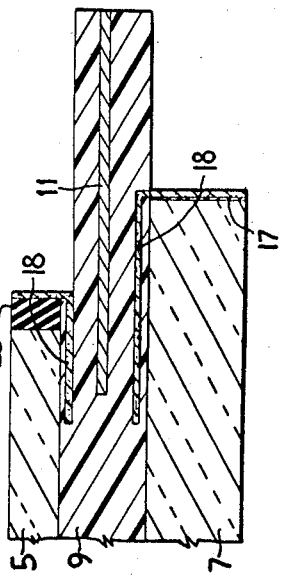
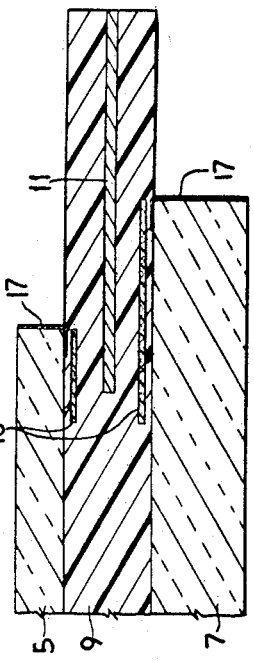
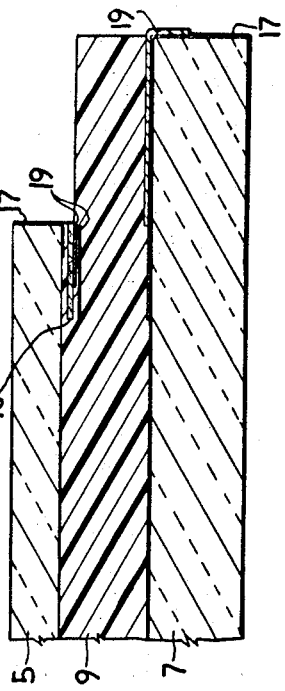
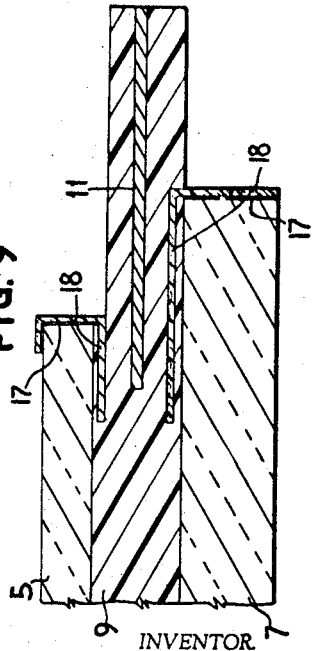
INVENTOR
DEE R. ORCUTT
BY
ATTORNEYS

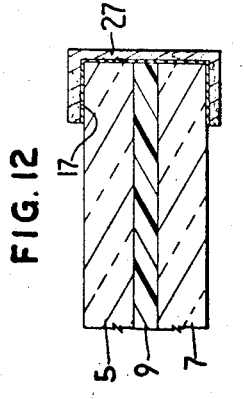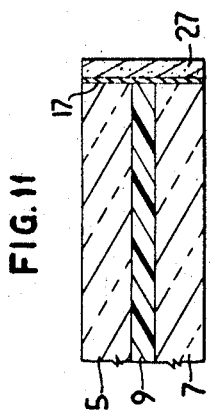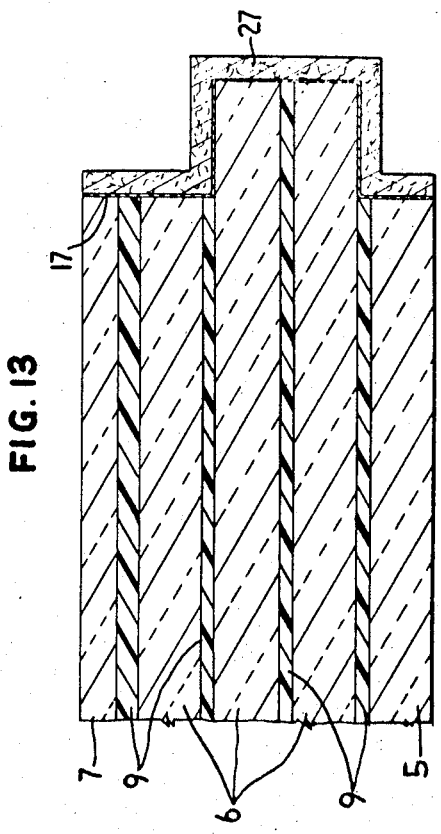

United States Patent Office 3,424,642
Patented Jan. 28, 1969

3,424,642
LAMINATED WINDOW PANELS
Dee R. Orcutt, Natrona Heights, Pa., assignor to Pittsburgh Plate Glass Company, Pittsburgh, Pa., a corporation of Pennsylvania
Original application Aug. 2, 1963, Ser. No. 299,582. Divided and this application Aug. 19, 1966, Ser. No. 573,506
U.S. Cl. 161—45      8 Claims
Int. Cl. B32b 3/02; D03d 11/00

ABSTRACT OF THE DISCLOSURE

A laminated window panel including edge framing means comprising a glass fiber reinforced thermosetting resin.

---

This application is a division of application Ser. No. 299,582, filed Aug. 2, 1963, now abandoned; which application is a continuation-in-part of application Ser. No. 275,448, filed Apr. 24, 1963, now abandoned; and which latter application is a continuation-in-part of application Ser. No. 261,996, filed Mar. 1, 1963, now abandoned.

This invention relates generally to improvements in the structure of laminated window panels comprising two or more sheets of rigid, transparent material alternating with plastic interlayers that bond the sheets together and to an improved process for their fabrication.

This invention has particular relation to transparent, laminated aircraft panels of the type that can be electrically heated and which would normally be exposed to extremely low temperatures and pressures on at least one surface thereof during high altitude flight.

Specifically, this invention is concerned with the development of improved aircraft window panels and like assemblies and envisions making certain applications of fiberglass reinforced, thermosetting resin in the marginal area of the panels outside their viewing area to improve their structure and the method for their fabrication.

In the fabrication and manufacture of laminated window panels, one material that is frequently used to form the rigid, transparent sheets or plies of the laminate is glass. However, for many applications, polyester resins, acrylic resins, polycarbonate resins and other like materials may be advantageously employed in forming rigid, transparent sheet material for use in the structure of laminated window panels. For example, a polycarbonate which has been found to be very satisfactory for use in laminated window panels is produced from a monomer commercially known as CR–39. The composition of CR–39 is fully disclosed in U.S. Letters Patent 2,370,565, granted to Irving E. Muskat and Franklin Strain. Thus, for the purpose of the present invention, when reference is hereinafter made to glass sheets or plies, used in the panel structure, it is intended that the expression should also include rigid, transparent, resinous sheet materials.

The improvements in the panel structure contemplated by this invention relate to the use of a fiberglass reinforced thermosetting resin therein. Typical examples of its employment are (1) as protection for electrical terminal blocks and lead wire connections, (2) as interlayer inserts for the prevention of delamination and/or cold chipping and for reinforcing the interlayer material, and (3) as edge frames or channeling disposed about the periphery of the laminated aircraft panel for edge and interlayer protection.

Generally, the laminated panels, according to the present invention, employ fiberglass reinforced thermosetting resinous material, which has a relatively low coefficient of thermal expansion, in the marginal portion of the assembly outside the viewing area. The reinforced resinous material is flexible when uncured and becomes rigid upon curing. In fabricating such panels, the flexibility of the uncured resinous material helps produce an intimate surface to surface contact between the reinforced resinous material and the other elements of the panel when assembled for lamination. The thermosetting property of the resinous material enables it to harden while maintaining said intimate surface to surface contact during the final lamination of the panel under conditions of elevated temperature and pressure commonly developed in an autoclave.

The cured, reinforced resinous material of this invention has a relatively low coefficient of thermal expansion. When finally incorporated into the panel structure, this property of the material prevents the development of undesirable stress concentration due to adjacent materials expanding (or contracting) at too great of a differential rate. It has been generally found desirable for most of the disclosed applications that the coefficient of thermal expansion of the reinforced resinous material be in a range from about 0.5 to 8.0 microinches/inch/°F. Preferably, the coefficient of thermal expansion should lie within a range from about 1.5 to 7.0 microinches/inch/°F. Consistently good results have been obtained, however, when the coefficient of thermal expansion of the cured, reinforced resinous material fell into a range from about 2.0 to 6.0 microinches/inch/°F.

The proposed improvements in the panel structure have particular relation to the problems normally encountered in electrically heated aircraft panel designs and applications. Thus, in connection with the contemplated uses of fiberglass reinforced thermosetting resin, consideration must be given to electrical, chemical, thermal and liquid penetration problems as well as physical or mechanical problems in ascertaining the extent of the improvements made in the panel structure.

The construction and use of electrically heated laminated panels for aircraft windows or windshields is per se well known. Generally, the panel consists of an electrical heating circuit located between two or more sheets of glass or other rigid, transparent plies which are bonded together by a thermoplastic interlayer material, such as polyvinyl butyral, a silicone resin or interlayer material such as disclosed in applications Ser. No. 68,942 and 68,943 of Wismer et al., filed Nov. 14, 1960, both now abandoned for Glass-Resin Laminates. Provision is generally made for mounting one or more electrical terminal blocks on the panel assembly to accommodate electrical power connections supplying current to the heating circuit.

Specific embodiments of the above basic panel may assume various shapes and the arrangement of the panel components may vary depending upon particular design requirements. Additional components such as temperature control sensing devices may be incorporated into the basic panel structure.

The sheets of glass used in the panel may be of the same or different sizes. The peripheral margins of the interlayer material may be cut flush with the edges of adjacent glass sheets and/or may extend beyond the edges of some of the glass sheets to provide in itself a resilient means for supporting the laminated glass assembly. The interlayer may be provided with inserts which have characteristics that inhibit delamination and a phenomenon known as "cold chipping." Where an interlayer has extended portions, these portions may include interlayer inserts for reinforcement of the interlayer material. Electrical terminal blocks may be mounted on any desired surface of the panel which is accessible for power lead attachment purposes when the panel has been mounted on the aircraft body.

The present invention is directed to the solution of problems which have arisen primarily in conjunction with known aircraft designs and applications of electrically heated laminated glass panels, although it will be recognized that certain embodiments described hereinbelow are susceptible of use in laminated assemblies of rigid, transparent resinous sheet material and assemblies not provided with heating means.

SURFACE MOUNTED TERMINAL BLOCKS

One such problem involves the use of surface mounted terminal blocks requiring the extension of electrical lead connections from the terminal block, across a marginal portion of the panel and into an interlayer for attachment with a heating circuit and/or temperature sensing device. External lugs on the terminal blocks connect the interior circuits of the panel to a suitable power source located elsewhere in the aircraft.

In such applications, problems have arisen in providing the required terminal mounting and lead wire connections by ordinary fabrication techniques while maintaining adequate protection therefor against normal hazards incident to the specific panel design and use.

Previous attempts to provide adequate protection for surface mounted terminal blocks and lead wire connections, including provision of insulating sleeves about the lead wires and the application of layers of epoxy resin bonding material, have not proved entirely satisfactory. Previous materials do not bond intimately enough to the assembly and the lead wires to furnish an effective seal against atmospheric elements such as water vapor, fumes from aircraft propellants, etc., and to provide mechanical protection for the lead wires and a proper electrical insulation to prevent their grounding.

In one aspect, this invention relates to laminated panels of the type having at least one terminal block mounted on an exterior surface of the assembly and lead wires extending from the terminal block across the exterior margin of the assembly to an electrically conductive circuit comprising a bus bar and a film located interiorly of the glass laminate. It has been found necessary to extend the lead wire about the outer margin of the assembly because drilling a hole in the panel plies and possibly other lamina of the assembly to permit a direct interior connecting path for the lead wire from the externally mounted terminal block to the interior bus bar structurally weakens the panel unduly for service in aircraft.

Briefly, this aspect of the invention is based upon finding that a woven fiber glass tape or cloth impregnated with a thermosetting resin can be advantageously used in the fabrication of the above-mentioned panels to provide excellent electrical, mechanical and fluid penetration protection and to securely bond the surface mounted terminal block and the lead wires to the panel structure.

INTERLAYER INSERTS

Another problem which has arisen with existing aircraft panel designs and applications involves "delamination" and what has been commonly referred to as "cold chipping." The normal construction of aircraft windows, as pointed out above, consists of a laminate made up of two or more plies of glass with polyvinyl butyral or like interlayers. The interlayers are usually relatively thick, varying from ⅛ to 4/10 inch in thickness. One or more of the interlayers may extend beyond the edges of the glass plies and may contain one or more reinforcing frames or inserts of aluminum, stainless steel, or other suitable material bonded within the interlayer, in a plane substantially parallel to that of the viewing surfaces of the panel, and extending inwardly beyond the edges of the glass. The interlayer extension and reinforcing frame securely mount the panel to the aircraft body. The reinforcing frame or insert imparts increased shear resistance to the extended portion of the interlayer in a normal installation.

The coefficient of thermal expansion of the polyvinyl butyral plastic is approximately 6 times that of glass in the normal temperature range in which aircraft is used. When the laminate is exposed to extremely low temperatures, the difference in thermal expansion of the glass and plastic frequently causes delamination or chipping of the glass at the bonded surfaces. "Delamination" occurs upon failure of the glass to plastic adhesive bond and "cold chipping" occurs as a result of the glass to plastic adhesive bond being stronger than the cohesive bond between adjacent portions of a glass surface. Generally, cold chipping and/or delamination originates along the edge of the interior surface of the glass sheets, where it is theorized that the stress concentration is greatest. This stress concentration and consequent delamination and/or cold chipping is even more pronounced along the edge of a larger glass sheet when the glass sheets are of unequal area. In actual aircraft applications, this stress concentration is intensified due to the pressure differential imposed on the mounting at high altitude flying. A temperature gradient developed by operating deicing heating circuits, located interiorly of the panel, imposes additional stress on the panel.

Previous attempts to reduce the tendency for delamination and cold chipping have been rewarded with only a moderate degree of success. One method previously employed involves the addition of an adhesive having low temperature elasticity to the interior marginal surface areas of the glass plies adjacent to the interlayer. This layer of elastic bonding material extends inwardly from the edges of the glass plies and preferably also extends downwardly over at least a portion of the edges of the glass plies, a distance sufficient to avoid the possibility of getting plastic interlayer material on the glass edge during the laminating process. Such an arrangement and examples of elastic bonding materials that may be employed are fully disclosed in U.S. Letters Patent 2,697,675, granted to R. A. Gaiser.

Another method previously employed to reduce the tendency for delamination and cold chipping is to insert a complete parting material in the interlayer at varying depths from the inboard surfaces of the glass plies. This method and examples of complete parting materials that may be used are disclosed in U.S. Letters Patent 2,650,890, to W. K. Bledsoe and 2,991,207, to P. A. Miller. Complete parting materials other than cellophane or pressure sensitive cellophane tape which have been successfully used include pressure sensitive Mylar and Teflon tapes.

Both of the above two methods are based on the theory of relieving the stress concentration before delamination and/or cold chipping occurs.

A third method involves the use of balancing inserts bonded to the interlayer outside the margin of the smaller glass sheet to oppose the margin of the larger glass sheet that extends beyond the periphery of the smaller glass sheet. This solution is fully disclosed in U.S. Letters Patent 2,758,042 to R. F. Raymond et al. In this third method, the theory is to statically counterbalance the stress concentration before delamination and/or cold chipping occurs.

The major deficiency of the previously used methods of reducing the tendency for delamination and cold chipping is that they cease to function well at extremely low temperatures, i.e., temperatures below −50° F. and as low as −80° F. Thus, a second aspect of this invention relates to improving the resistance of heated laminated glass panels to delamination and cold chipping at extremely low temperatures.

This aspect of the invention is based on the finding that a woven fiberglass tape impregnated with a thermosetting resin and having a thermal coefficient of expansion approximating that of glass can be advantageously employed to form interlayer inserts in laminated aircraft panels to impart an improved resistance to delamination and cold chipping, even at temperatures as low as −80° F.

EDGE FRAMES

A third problem which has arisen in connection with aircraft panel designs and applications involves providing adequate mechanical protection for the edges of the panel plies and also to provide adequate protection against fluid penetration by jet fuels, ethylene glycol, moisture, etc., into the interlayer. Mechanical protection is desirable to avoid chipping or breaking the edges of the panel during normal handling and/or installation. Protection against fluid penetration into the interlayer may involve mechanical as well as chemical considerations and becomes necessary where fluids which would adversely affect the panel structure may normally come in contact therewith. Freezing moisture or fluids which would chemically react to weaken the interlayer material or its bond to the other structural elements of the panel assembly could obviously render the panel unacceptable for normal use.

In order to achieve desired mechanical protection and to provide a mechanical and/or chemical seal along the edges of the panel, it is necessary to use edge frame material which is essentially chemically inert to normally encountered fluids, conforms well to the contour of various panel designs and is mechanically strong.

Previously used edge frames are not found to be entirely satisfactory either because of their inherent bulk or because they were inherently weak in one or more of the physical or chemical properties enumerated above. Thus, another aspect of this invention has relation to providing an improved edge frame for laminated aircraft panels.

This aspect of the invention is based on the discovery that a fiber glass reinforced tape impregnated with a thermosetting resin can be conformed readily to the contour of various panel designs with a minimum of bulk and exhibits the superior mechanical and chemical properties required for aircraft panel installations.

METHOD

Of particular importance is the discovery of an improved method of fabrication whereby uncured resinous fiber glass tape for interlayer inserts is interleaved with the interlayer material during assembly and/or is bent to fit the curves and angles encountered in surface mounted terminal block and lead wire installations and/or edge frame construction and thereafter the resinous fiber glass tape is cured to the final or "C" stage during the step of laminating the panel sheets or plies to produce a finished, completely assembled panel. The term "uncured," as used herein, denotes the absence of the final or "C" stage of curing (solvent-insoluble stage) during which the resinous material exhibits little or no plastic flow upon heating. This term does include lesser stages of curing, e.g., "A" and "B" stage partial cures.

Therefore, an object of this invention is to provide improved electrically heated laminated panels having exterior lead wires connecting an interior electrical circuit with an exteriorly mounted terminal block.

Another object of this invention is to provide improved laminated panels, of the type that are normally electrically heated, which contain interlayer inserts for reinforcing the interlayer and/or for imparting an improved resistance to delamination and cold chipping at extremely low temperatures.

Still another object of this invention is to provide improved laminated panels, for aircraft and like installations, having edge frames which are highly resistant to fluid penetration, which provide mechanical protection for the edges during normal handling and/or installation, and which conform very closely to the configuration of the peripheral edge of the panel.

A further object of this invention is to provide improved electrically heated laminated panels for aircraft which will successfully withstand exposure to fluid penetration, high and low temperatures, and mechanical hazards encountered under normal operating conditions.

Another object of this invention is to provide a method of fabrication whereby surface mounted terminal connections, interlayer inserts and edge framing may be finally integrated into the panel structure during the laminating step in the process of the panel fabrication without performing any auxiliary steps other than a conventional initial assembly with the other panel components.

These and other objects of the invention will become more apparent during the course of the following description when taken in connection with the accompanying drawings.

In the drawings, wherein like numerals are employed to designate like parts throughout the same, FIG. 1 is a schematic representation in plan of a typical panel assembly in the fabrication of which the method of the present invention can be practiced.

FIGS. 2-4 are typical sections along a line such as II—II of FIG. 1 illustrating the details of various embodiments of surface mounted terminal blocks and comprises one aspect of the present invention.

FIGS. 5-10 are typical sections along a line such as II—II of FIG. 1 illustrating the details of various embodiments of interlayer inserts and comprises another aspect of the present invention. In addition, FIGS. 9 and 10 illustrate various forms of combining interlayer inserts with edge framing.

FIGS. 11-13 are typical sections along a line such as II—II of FIG. 1 illustrating the details of various embodiments of edge frames and comprises still another aspect of the present invention.

In FIG. 1 there is shown a typical article produced in accordance with this invention in which a terminal block 1 is mounted on the inboard surface of the laminated glass panel 3 which is constructed to be electrically heated.

The construction of electrically heated panels is per se well known. As disclosed in U.S. Letters Patent 2,614,944, granted to William O. Lytle, an essentially transparent electroconductive heating film may be provided on a surface of one of a plurality of sheets of glass laminated together by a thermoplastic interlayer. The interlayer may itself be comprised of a laminated structure of thin sheets of thermoplastic material assembled together to the composite thickness required. Additionally, it is known that a heating circuit may be provided by an essentially transparent heating filament embedded within the plastic interlayer in lieu of the electroconductive film on a glass sheet surface, such as disclosed in U.S. Patent No. 2,813,960 to Arthur Egle and Walther Bethge.

Bus bars extending along opposing marginal portions of one of the glass sheets are conventionally attached to the heating filament or film for distributing electrical power thereto. Lead wires connect the bus bars to terminal blocks located on the exterior of the panel. Electric current is supplied by means of external connections from the terminal blocks to a power source (not shown).

FIG. 2 shows a typical cross-section through a portion of a panel fabricated in accordance with the practice of the present invention showing a surface mounted terminal block and lead wire connections and constitutes one aspect of this invention. The sheet of glass 5 constitutes the outboard glass ply of the panel 3 in its installed position. The sheet of glass 7, on the other hand, is the inboard glass ply of the panel 3. Interposed between the two sheets of glass is a thermoplastic interlayer 9 which bonds the glass plies together.

The interlayer 9 may be comprised of a series of thin sheets of a suitable thermoplastic material, such as polyvinyl butyral, which ultimately fuse together into a unitary body during the process of laminating under heat and pressure. The interlayer 9 may also contain a reinforcing frame or insert 11 to impart shear resistance to the extended portion of the interlayer 9 which supports the panel assembly 3 in its installed position.

A heating circuit is also located on the interior surface of glass sheet 5 and comprises an essentially transparent electroconductive film 10 and bus bars 12 on the glass surface facing the interlayer 9. Alternately, an essentially transparent filamentary circuit (not shown) or other suitable heating means embedded within the interlayer may be employed. Temperature sensing devices may also be included within the panel. The bus bars are connected to the heating circuit to facilitate lead wire attachments.

Lead wires 13, of which one is shown, extend from the bus bar 12 along or through the interlayer and around the inner glass ply 7 to a surface-mounted terminal block 1. Where necessary, the interlayer is split during the process of fabrication to permit passing lead wires therethrough.

In one specific embodiment of this invention, as shown in FIG. 2, the lead wire 13 is covered by two strips of a woven fiberglass tape 15 impregnated with a thermosetting resin. As will be seen by reference to FIG. 2, the tape 15 extends for some distance into the interlayer, is then intimately conformed to the edge of the glass sheet about which the lead wire 13 traverses and finally extends along the exposed surface of the inner glass ply 7 to the surface-mounted terminal block 1.

One of the tapes extends a short distance beneath the terminal block and a portion 16 is suitably undercut to provide space in the terminal block therefor. The other tape extends completely across the terminal block and elastic bonding material 17 such as disclosed in U.S. Letters Patent 2,697,675, supra, is applied between the tape and areas of the glass along which the tape extends.

The woven fiber glass tape can be impregnated with any suitable "A" (water-soluble or dispersible) or "B" (solvent-soluble) stage thermosetting condensate. Such condensates can be uncured ("A" stage) or partially cured ("B" stage), yet are always capable of further curing to the "C" (solvent-insoluble) stage using heat alone or a combination of heat and a curing catalyst or catalysts with or without superatmospheric pressures. The curing temperatures can range from about 100° to 400° F. with or without catalysts to effect curing in a reasonably rapid period of time, viz., about 5 to about 120 minutes, using pressures up to about 500 pounds per square inch, e.g., from about 15 to about 500 pounds per square inch, with the higher pressures being used to aid in simultaneous curing and laminating of a thermosettable condensate which has been precured (partially cured) to a "B" stage prior to autoclaving (the final stage of laminating).

Usually, however, an "A" stage to early "B" or medium "B" stage thermosetting condensate is employed. Such condensates can be cured readily at temperatures of from about 200° to 360° F. and pressures ranging from 30 to about 300 pounds per square inch for a 15 to 90 minute curing cycle. Preferably, the curing is conducted at temperatures of 275° to 300° F. using pressures of 150 to 250 pounds per square inch over a 30 to 40 minute cure cycle to attain the final or "C" stage of curing.

Suitable exemplary "A" (essentially uncured) to "B" stage (partially cured) thermosetting condensates which can be employed in the practice of this invention include: phenol-formaldehyde condensates; resorcinolformaldehyde condensates; melamine-formaldehyde condensates; urea-formaldehyde condensates; condensate polyblends (intimate mechanical mixtures) of phenol-formaldehyde and (1) melamine-formaldehyde, (2) urea-formaldehyde; (3) dicyandiamide-formaldehyde; interpolymer cocondensates of phenol, melamine and formaldehyde, or phenol, urea and formaldehyde; etc. Also uncured or partially cured polyester condensates can be used.

Phenolic condensates, especially "A" or "B" stage phenol-formaldehyde condensates, are particularly well-suited for use in accordance with this invention. Typically, these phenol-formaldehyde condensates in the "A" stage have a viscosity at 25° C. of from 80 to 160 centipoises per second, and are readily soluble in acetone, ketones and most common organic solvents. Suitable "A" or "B" stage phenol-formaldehyde condensates can be produced according to conventional condensation procedures with or without condensation catalysts. When catalysts are used to aid and accelerate condensation, it is customary to employ either a one-stage condensation using a basic catalyst or a two-stage condensation using acid catalyst. The mol ratio of formaldehyde to phenol can vary considerably, e.g., from 0.5 to 4.0:1. Usually, however, the mol ratio of formaldehyde to phenol ranges from about 0.7 to 3.0:1, and either phenol or formaldehyde can predominate on a mol basis to effect condensation. Generally, there is some excess phenol present when the phenol-formaldehyde condensate is in the uncured state.

Suitable condensation and/or curing catalysts which can be used to aid in advancing the phenolic condensate or condensate mixture to the final ("C" stage) include, among others, ammonium chloride, ammonium sulfate, ammonium nitrate, ammonium bromide, hexamethylene tetramine, etc. Other suitable conventional curing catalysts which can be used are set forth in U.S. Patents 1,717,600, 1,844,571, 1,892,848, 1,944,143, 1,755,135, 2,174,132, 2,175,793, 2,205,427 and 2,565,538.

A typical, commercially available thermosetting phenol-formaldehyde condensate impregnated fiber glass tape suitable for use in this invention is "Conolon 506" tape, available from Narmco Resins and Coating Company, Costa Mesa, Calif. "Conolon 506" phenolic condensate preimpregnated glass fiber tape contains approximately 34 percent phenol-formaldehyde condensate (6 percent volatile content) with the remainder being glass fibers. The phenol-formaldehyde condensate therein in the "A" stage has a viscosity of 80 to 160 centipoises per second at 25° C.

Following is a list of pertinent properties of Conolon 506 with representative values assigned to each property. These values were taken from the results of actual tests performed on cured specimens of Conolon 506 and published by its manufacturer in bulletin LDS 2A·BM·HR· 7/60 and a technical bulletin entitled "Conolon—506."

Physical Properties: flexural strength, about 62,000 p.s.i.; flexural modulus, about $3 \times 10^6$ p.s.i.

Chemical Properties: After 30 days water immersion: flexural strength, 60,500 p.s.i.; tensile strength, 48,400 p.s.i.; compression strength, 32,160 p.s.i. After 24 hours exposure in MIL-M-3136 hydrocarbon fluid standard test (Type III): flexural strength, 64,000 p.s.i.; change in weight, +0.41 percent. After 24 hours exposure in MIL-E-5559 ethylene glycol: flexural strength, 65,000 p.s.i.; change in weight, +1.02 percent.

Thermal Properties: Coefficient of thermal expansion in microinches/inch/°F. between −100° F. and 300° F.: longitudinal, from 4.5–5.0; diagonal (45°), from 2.5–5.0; transverse, from 4.6–5.0.

Electrical Properties: dielectric constant, (at one megacycle, dry), 3.41; dielectric constant (at one megacycle, wet), 4.12.

FIGS. 3 and 4 show other embodiments of the present invention. The essential difference between FIGS. 3 and 4 and FIG. 2 is in the arrangement of the component structures of the panel for different types of panel mounting and/or the number of inner and outer plies of glass used.

In the fabrication of the panel, the various panel members are assembled to conform to the particular panel design and may, for example, display the relationships shown in FIGS. 2 to 4. Generally, the structure is built up layer by layer beginning with the outer glass ply. During the intermediate steps of fabrication, the lead wire 13 is placed between pieces of uncured fiberglass tape which have been impregnated with a thermosetting resin. An elastic bonding material 17, such as a rubber base adhesive disclosed in the aforesaid Gaiser patent, is applied to the areas of the glass with which the tape would normally come into contact. Alternately, a thin film of polyvinyl butyral, about .015 inch thick, may be used as the bonding material without adversely affecting the resistance of the panel to delamination and cold chipping, to be discussed more fully hereinafter. It has been found that a thin polyvinyl butyral bonding film, having relatively low mass, fails to develop a sufficient stress concentration at low temperatures, due to the differential contraction of the polyvinyl butyral and the glass, to cause delamination and/or cold chipping when the film is sandwiched between the glass edge and a material having a comparable coefficient of thermal expansion. The tape, lead wires and connected terminal block are then placed on the elastic bonding material or the polyvinyl butyral film. In some cases, it has also been found desirable to place an elastic bonding material or polyvinyl butyral film layer between the fiberglass tape and the terminal block.

The assembled panel is then subjected to heat (about 275° to 300° F.) and pressure (about 200 pounds per square inch) for a sufficient time (about 35 minutes) to effect the lamination of the glass plies and the simultaneous curing of the impregnated tape.

Curing the material known as "Conolon 506" produces a hard, smoothly surfaced material having a low coefficient of expansion, good electrical insulating properties, high mechanical strength, and excellent resistance to moisture and fluid penetration.

The uncured Conolon 506 is very flexible and capable of conforming very intimately with the shape of the terminal block and lead wire. Therefore, this material is susceptible of intimate assembly before the panel is laminated.

Samples produced in accordance with the above process employing the type mounting, insulation material and construction shown in FIGS. 2 to 4 have successfully withstood standard electrical insulation tests, torque tests, humidity and moisture tests, and temperature cycling tests simulating conditions encountered in normal field service of electrically heated panels.

FIGS. 5–10 show typical cross sections through a portion of a panel fabricated in accordance with the practice of the present invention illustrating various embodiments of interlayer inserts and comprises another aspect of this invention. The basic panel arrangement of glass plies 5, 7 bonded together by interlayer material 9 is substantially the same as that set forth above with reference to FIGS. 2–4. Interlayer inserts 18 are provided to resist delamination and cold chipping. The panel 3 may also include a reinforcing frame or insert 11 disposed within the interlayer 9 to provide shear resistance to the extended portion thereof after installation.

The heating circuit, terminal blocks, etc., have been omitted in FIGS. 5–13 for clarity of illustration, although the invention contemplates that the panel may be heated.

In the embodiment of FIG. 5, interlayer inserts 18, composed of woven fiberglass cloth or tape impregnated with a modified phenolic resin, are laminated into the polyvinyl butyral interlayer 9 adjacent the inner and outer glass plies. The thickness of the inserts 18 can be .010 inch or greater. They extend from the edges or from slightly outwardly of the edges of the glass plies inwardly a distance of ¼ to ⅜ inch beyond the edge of the smaller ply. The inserts have their inner ends rounded with a 1 inch radius at the corners. In the preferred arrangement, inserts 18 extend about ⅜ inch inwardly from the edge of the smaller ply. The insert 18 may be cut in one piece from a sufficiently large piece of impregnated fiber glass cloth or may be composed of a plurality of separate strips of impregnated fiber glass tape in overlapping or abutting relation. One impregnated fiber glass material which has been used successfully as an insert is Conolon 506.

The phenolic fiber glass inserts 18 are located in the interlayer and spaced .015 to .025 inch from the glass surfaces. It is desirable to maintain the thickness of the interlayer material between the glass surface and the insert 18 as thin as is practical. This thickness is limited to .015 inch at the present time, since this is the thinnest polyvinyl butyral interlayer sheet commercially available. The inserts 18 are assembled in the uncured state in which they are susceptible of very intimate surface to surface contact with the adjacent plies of the interlayer. During autoclave pressing, the resin maintains its intimate surface to surface contact while it is cured and forms a rigid material having a thermal coefficient of expansion approximately 1 to 2 times that of glass.

Conolon 506 exhibits a superior bond to itself as well as to polyvinyl butyral and other materials when autoclave pressed.

The insert material can also be cured to the "C" stage before assembly into the laminate. In this case it is necessary to sand blast the surface of the insert to obtain a good bond to the interlayer material.

It is desirable to place a layer of elastic bonding material 17 on the seamed edges and which extends approximately ⅟₁₆ inch into the laminate. This helps prevent delamination and/or the formation of chips on the relatively weaker edges of the glass. A reinforcing frame or insert 11 may be provided at the center of the interlayer 9.

In the embodiment of FIG. 6, the panel is assembled in the same manner as discussed with reference to FIG. 5, with the exception that the surfaces of the fiber glass resin inserts 18 are treated on the side facing the center of the interlayer with a complete parting agent 19, such as a pressure sensitive cellophane, Mylar or Teflon tape, to weaken the bond between the plastic interlayer and the inward facing surface of the insert. This surface treated with the complete parting agent 19 extends from the outer edge of the insert to a point approximately ⅔ of the total insert width. The weakened bond in this section can be accomplished by the addition of the pressure sensitive tape or other types of complete parting medium to the surfaces of the inserts when the assemblies are made with uncured resin.

When precured inserts are used, the weakened bond can be accomplished by avoiding sand blasting this particular area of the insert. On elastic parting medium 17 is also applied to the edges of the glass plate and the panel may include a reinforcing frame or insert 11 at the center of the interlayer 9.

In the embodiment shown in FIG. 7, the resin fiber glass insert is used only in the area near the outboard glass ply 5. Part of the inboard surface of the insert 18 is treated to weaken the bond between the polyvinyl butyral plastic and the insert as was explained with reference to FIG. 6. In addition, a complete parting agent 19 was incorporated in the vinyl interlayer at a distance of .020 inch inboard from the insert and coextensive therewith. The inboard ply of glass 7 is protected from delamination and chipping by the application of an elastic bonding material 17 on the glass surface and extending inwardly to the same depth as the fiber glass insert and a layer of complete parting material 19 extending inwardly to the edge of the outboard ply.

The embodiment of FIG. 8 shows an assembly in which the resin fiber glass inserts 18 have been incorporated and, in addition, the reinforcing frame or insert normally found in aircraft windows is herein comprised of a series of reinforcing inserts 11 of resin fiber glass material instead of the usual single metallic frame. The reinforcing inserts 11 can be of a thickness of .010 inch or greater. The reinforcing inserts 11 are interleaved with sheets of polyvinyl butyral of approximately the same thickness as that of the inserts. The reinforcing inserts 11 bond firmly to the vinyl interlayer 9 during autoclave pressing. An elastic bonding material 17 is applied to the edges of the glass plies to inhibit delamination and protect the relatively weaker edges against cold chipping. In this embodiment, there is also shown a complete parting material 19 adjacent the edges of the inboard ply which separates the elastic parting material 17 from a plastic bumper 21 of a material such as polyvinyl butyral and a filler block 23. The filler block 23 can be of pre-cured phenolic or can be made up of the resin fiber glass material.

In the embodiment of FIG. 9, the resin fiber glass inserts 18 have been extended around the edges of the glass plies. As in previously described embodiments, the inserts are spaced approximately .015 inch from the surfaces of the glass. The thin, intermediate .015 inch polyvinyl butyral layer may be extended over the glass edges to bond the extended portion of the inserts to the edges of the glass plies. As pointed out above, it has been found that a thin polyvinyl butyral bonding film, applied to the edges of the glass plies and having a relatively low mass, has no adverse effect on the resistance of the panel to delamination and cold chipping when the thin film is sandwiched between the glass edge and a material having a comparable coefficient of thermal expansion. Alternately, the .015 inch polyvinyl butyral layers between the inserts and the glass plies can be cut off at the edges of the glass and the fiber glass resin insert 18 bonded to the edges with an elastic bonding material 17, such as employed in the Gaiser Patent 2,697,675.

The inserts 18 may extend across a portion only of the edges, may extend completely across the edges or their extended portion may terminate along the exposed marginal surface areas of the glass plies. Also, the bonding material for the extended portion of the inserts may stop short of the terminal end of said extended portion. The Thiokols, Silastics or like sealing materials may be used to fill the opening formed thereby to provide a weatherproof seal against fluid penetration between the edges of the glass plies and the extended portion of the inserts. In addition to providing protection against delamination and cold chipping, some protection is also offered to the glass in the prevention of edge chipping during handling and installation.

The embodiment of FIG. 10 is similar to that of FIG. 9 with the exception that the fiber glass resin insert near the outboard ply has been extended beyond the edge of the glass and bent outwardly to form an opening. This opening is filled, after lamination, with Thiokol or Silastic sealing materials 25 to form a weatherproof bumper strip around the outboard ply of glass.

Electrically heated, laminated glass panels produced in accordance with the above process and employing the type interlayer inserts and construction shown in FIGS. 5 to 10 showed no evidence of deterioration after a series of exposures to temperatures of −85° F. and +225° F. The above panels were also subjected to the standard cold cycling test, given to other production designs not having the resinous fiber glass inserts, and showed an improved resistance to delamination and/or cold chipping of about 400 percent. A standard cycle for a cold cycling test involves "soaking" the panel in a cold chamber maintained at −65° F. for a minimum of 2 hours and then impressing 50 percent over the rated power on the deicing circuit until the temperature reading of a thermocouple attached to the panel reaches about 120° F. This cycle was repeated with each cycle immediately following the previous cycle until failure occurred. Compared to production designs, the panels of the present invention successfully withstood about 4 times as many of the above cycles before delamination and/or chipping occurred. This proved that the panels having Conolon 506 inserts were vastly superior to production panels not containing Conolon 506 inserts with respect to their ability to withstand delamination and cold chipping.

FIGS. 11 to 13 show typical cross-sections through a portion of a panel fabricated in accordance with the practice of the present invention illustrating various embodiments of edge frame construction and constitutes another aspect of this invention. The basic panel arrangement of glass plies 5, 7 bonded together by interlayer material 9 is substantially the same as set forth above, except that there is no interlayer extension and the edge frame 27 is sufficiently wide to cover all interfaces of the panel and completely encloses the marginal edge of the panel. In FIG. 13, glass core plies 6 are used between the outer glass ply 5 and the inner glass ply 7 and are separated by interlayer material 9. One material which has been used very effectively for edge framing is Conolon 506.

Laminated glass units with edge frames can be produced by assembling the glass and interlayer components in the normal manner, applying a thin film of elastic bonding material 17 to the edges, then adding multiples of thin layers of the uncured resin impregnated fiberglass material, evacuating the complete assembly in a bag and then subjecting the bagged unit to elevated temperatures and pressure in an autoclave to effect the lamination and cure the fiberglass resin material. In some cases it may be desirable to maintain a vacuum on the unit during autoclave pressing to remove gases formed when the resin is curing.

According to this aspect of the present invention, the fiber glass reinforced resinous tape is applied about the margin of the assembly while uncured to make intimate surface to surface contact with the edge surface of the assembly. The width of the tape is at least greater than the separation between the extreme interfaces of the assembly so that the tape bridges the interfaces between the plies of the assembly as well as covering the marginal edge surface thereof. If desired, the tape may be of sufficient width to overlap the marginal portions of the outer major surfaces of the assembly. When cured, the intimate surface to surface contact is maintained and the interfaces and interlayer material are protected in the manner described generally above.

The resin fiber glass material is available in sheets approximately .010 inch thick and in the uncured state is pliable and will readily conform to irregular shaped edges and to edges where the various plies of the assembly do not match evenly. Pressing frames may be used to contain the material and press to desired finished dimensions. The cured material may also be machined or ground to finished shapes having controlled dimensional tolerances. In cured form the resin-impregnated fiber glass material or the fiber glass reinforced resinous material has a good resistance to mechanical and chemical damage and a coefficient of thermal expansion varying from 1 to 2 times that of glass.

The bonding film adhering the edge frame material to the glass may be either a thin film of polyvinyl butyral plastic, or an elastic bonding material 17 such as used in the previous embodiments, or a combination of both.

This edge frame construction appears to be most useful in laminated glass units where protection of the plastic interlayer as well as the glass edges (as in the embodiments of FIGS. 9 to 10) is desirable. It can, however, be applied to monolithic glass if required.

FIGS. 11 to 13 show typical glass constructions. Other combinations of glass and interlayer material with other edge configurations may be used and will become obvious in the light of the various embodiments described above.

Laminated glass panels produced in accordance with the above process and employing the type material and construction shown in FIGS. 11 to 13 were tested by exposing them to temperatures of −65° F., +300° F. and to 100 percent relative humidity at 125° F. for as long as 3 weeks. The results of all tests were satisfactory and showed no visible fluid penetration or deterioration of the panel. In contrast, the usual test for commercial production requires a maximum duration of one week of exposure of this type. These tests indicate that these panels tested meet conditions far more severe than those required for present commercial products of this type.

I claim:
1. A laminated glass panel comprising an assembly of rigid, transparent sheets including an inboard ply and an outboard ply bonded together by a plastic interlayer material having a relatively high coefficient of thermal expansion compared to that of at least one of said rigid, transparent sheets and having a substantially rigid fiber glass reinforced thermoset resin edge frame, said edge frame having a relatively low coefficient of thermal expansion compared to that of said plastic interlayer material, said edge frame having a width greater than the distance between the inner surfaces of the inboard and outboard rigid, transparent plies of the panel and being located in circumscribing relation about the periphery of said panel and bonded in intimate surface-to-surface contact with the marginal edge surface of said panel to circumferentially enclose said interlayer material and all the interfaces between said rigid, transparent sheets and said interlayer of said panel.

2. The laminated glass panel of claim 1 wherein the lateral edges of said edge frame extend over and are bonded to a portion of the outer surfaces of said inboard ply and said outboard ply whereby a substantially rigid edge frame is provided in circumscribing relation about and bonded to the marginal portion of said panel.

3. A laminated window panel comprising a plurality of rigid, transparent sheets separated from one another by plastic interlayer material having a relatively high coefficient of thermal expansion compared to that of at least one of said rigid, transparent sheets, said rigid, transparent sheets including an inboard ply and an outboard ply, and a cured, substantially rigid fiber glass reinforced thermosetting resin member disposed adjacent the outer edge surface of said panel, said member having a relatively low coefficient of thermal expansion compared to that of said plastic interlayer material, said member being of greater width than the distance between the inner surfaces of the inboard and outboard plies and being disposed with its lateral edges beyond said inner surfaces and bonded in intimate surface-to-surface contact with said outer edge surface so as to circumferentially enclose said interlayer material and all the interfaces between the rigid, transparent sheets and said interlayer material of said panel.

4. The laminated window panel of claim 3, further including a bonding material between said member and adjacent portions of said panel.

5. The laminated window panel of claim 3 wherein at least one of said rigid transparent sheets comprises a sheet of glass, the coefficient of thermal expansion of said plastic interlayer material is greater than about six times the coefficient of thermal expansion of said glass sheet between —100° F. and 300° F. and the coefficient of thermal expansion of said cured, substantially rigid fiber glass reinforced thermosetting resin member is less than about two times the coefficient of thermal expansion of said glass sheet between —100° F. and 300° F.

6. The laminated window panel of claim 3 wherein the lateral edges of said member extend over and are bonded to marginal portions of the outer surfaces of said inboard and said outboard ply whereby a substantially rigid member is provided in circumscribing relation about and bonded to the marginal surfaces of said panel.

7. The laminated window panel of claim 3 which further includes at least one rigid, transparent sheet disposed between said inboard and outboard plies that extends beyond the lateral edges of said inboard and outboard plies, and wherein the cured, substantially rigid fiber glass reinforced thermosetting resin member is disposed about and bonded in intimate surface-to-surface contact with the edge and extended marginal surface portions of said extended sheet so as to enclose and protect said extended marginal portion of said sheet.

8. In a panel assembly for lamination into a composite window panel comprising a plurality of rigid, transparent sheets separated from one another by plastic interlayer material having a relatively high coefficient of thermal expansion compared to that of at least one of said rigid, transparent sheets, said rigid, transparent sheets including an inboard ply and an outboard ply, the improvement comprising a flexible member of uncured thermosetting resin reinforced with fiberglass disposed in close adjacency and in intimate conformity with the outer edge surface of said panel, said member being of greater width than the distance between the inner surfaces of the inboard and outboard plies and being disposed with its lateral edges beyond said inner surfaces so as to circumferentially enclose said interlayer material and all the interfaces between the rigid, transparent sheets and said interlayer material, said flexible member being curable into a substantially rigid member having a coefficient of thermal expansion of less than about two times the coefficient of thermal expansion of said rigid, transparent sheets between —100° F. and 300° F. when subjected to sufficient heat and pressure to laminate said assembly into a composite window panel.

References Cited

UNITED STATES PATENTS

| | | |
|---|---|---|
| 2,145,930 | 2/1939 | Herron. |
| 2,306,314 | 12/1942 | Landin _____ 156—107 X |
| 2,313,508 | 3/1943 | Carman _____ 161—44 X |
| 2,650,976 | 9/1953 | Gaiser et al. _____ 156—99 X |
| 2,808,355 | 10/1957 | Christie et al. ____ 161—44 X |
| 3,081,205 | 3/1963 | Shorr _____ 52—208 |

JACOB H. STEINBERG, *Primary Examiner.*

WILLIAM A. POWELL, *Assistant Examiner.*

U.S. Cl. X.R.

161—93, 149, 199, 257; 156—107, 106; 52—616; 219—203, 522